Dec. 8, 1942.    G. LEISENHEIMER    2,304,578
SMOKE HOUSE
Filed Jan. 2, 1940    3 Sheets-Sheet 1

Inventor
George Leisenheimer
By
Attorney

Dec. 8, 1942.   G. LEISENHEIMER   2,304,578
SMOKE HOUSE
Filed Jan. 2, 1940   3 Sheets-Sheet 3

Inventor
George Leisenheimer
By
Attorney

Patented Dec. 8, 1942

2,304,578

UNITED STATES PATENT OFFICE 2,304,578

SMOKEHOUSE

George Leisenheimer, Brooklyn, N. Y.

Application January 2, 1940, Serial No. 312,164

2 Claims. (Cl. 99—259)

The present invention relates to smoke houses for the curing, smoking and baking of fish, meats and the like and to that type employing a rotating reel upon which the product being treated is hung or supported as is disclosed in the United States patent to Brand, No. 1,952,968.

In this type of smoke house, above described, the product to be treated is first placed upon a reel which is supported by overhead tracks, and then moved into the smoke house where it is connected with means for rotating the reel.

The present invention has for its object an improved and novel means for releasably coupling and driving the reel when properly positioned in the smoke house and for maintaining the axis of the reel in a fixed position while rotating, this means being most simple in construction, durable and economical over previously proposed constructions and subject to very quick manipulation without injury to parts.

The invention further resides in other sundry details of construction, combination and arrangement of parts hereinafter more fully described as the specification proceeds and as pointed out in the appended claims.

In the drawings, which show the preferred embodiment of the invention as at present devised—

Figure 2:
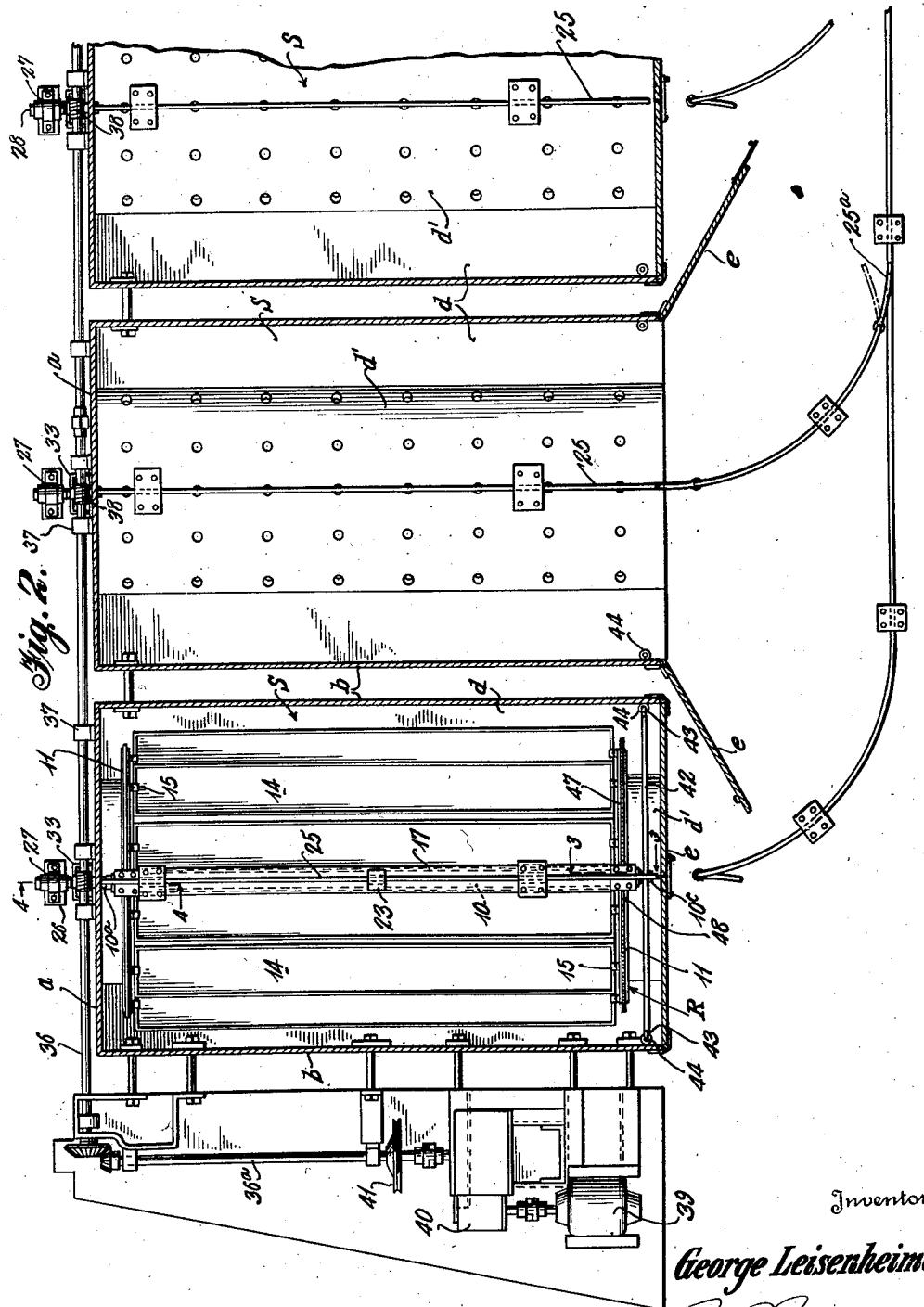
Figure 2 is a plan view of the arrangement shown in Figure 1, but with certain of the doors opening and with the top walls of the smoke house or chambers removed to better illustrate details of construction.
Figure 3:
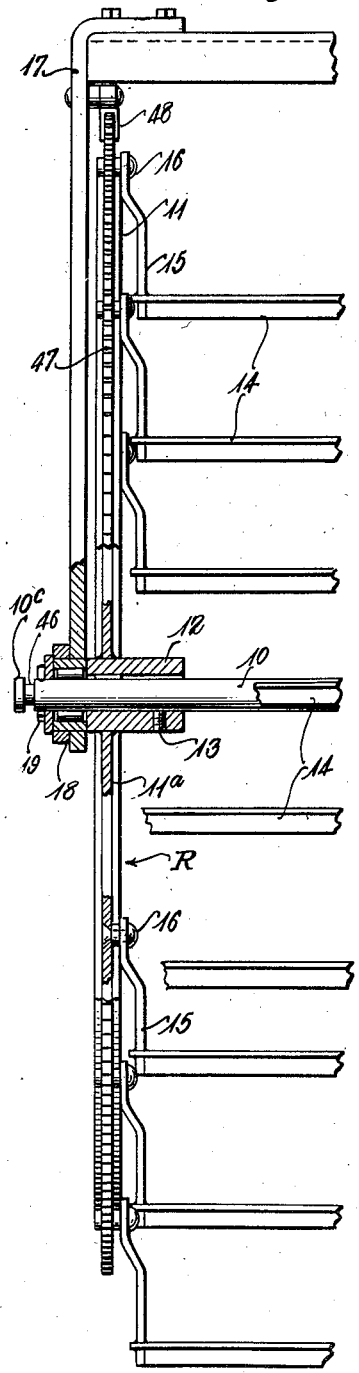
Figure 3 is an enlarged fragmentary view of one end portion of the reel with parts broken away to illustrate details of construction and may be considered as taken substantially on line 3—3 of Figure 2.
Figure 4:
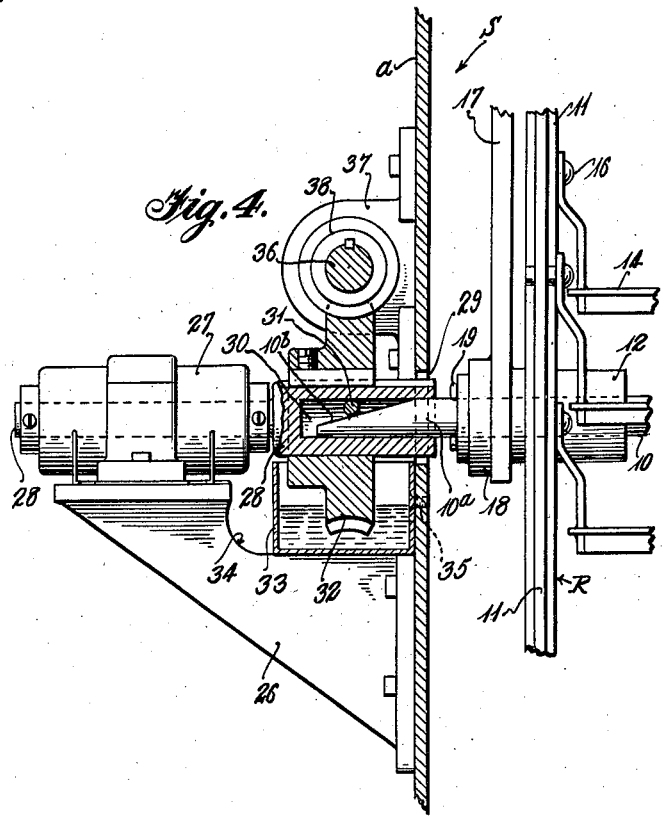
Figure 5:
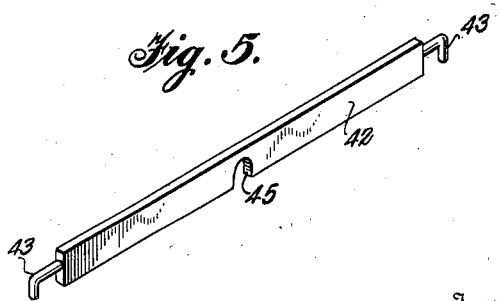

Figure 4 is an enlarged sectional view taken substantially on lines 4—4 of Figure 2 with parts broken away to illustrate the manner in which the shaft or axis of the reel is detachably coupled with the driving means; and Figure 5 is a perspective view of a brace rod for engaging the end of the reel shaft, shown in Figure 3, for maintaining the reel in operative position when in the smoke house or chamber.

Referring in detail to the drawings in which like characters denote similar and like parts through the several views, S denotes a smoke house or chamber, which may be arranged side by side in a battery in any convenient or desired number, and may be of any suitable construction or design useful for the purpose. In modern practice, the use of metal chambers, which form smoke houses, are generally in vogue and each comprise a back wall $a$, side walls $b$, a top wall $c$, a bottom wall $d$, and a front wall which usually is in the form of hinged doors $e$. The bottom wall $d$ may constitute a hearth, or the hearth may comprise refractory material $d'$, upon which is placed wood, wood shavings or any other suitable material for producing the smoke for the treating process.

The doors $e$ are of such character or construction as will hermetically seal the chamber, but when desirable a suitable flue or vent may be provided equipped with regulating means for allowing smoke to escape from the chamber. Also the hearth $d'$ may be provided with suitable openings to provide the required draft.

The compartments, as can be seen from Figure 2, are preferably longer or of greater dimension from their front wall and the back wall than between the side walls so as to enable a relatively long reel R to enter endwise into the compartment and to be contained therein in that position. The reel R comprises a shaft 10 having circular headers 11, which may be in the form of wheels, one at each end of the shaft, the shaft having trunnion ends 10a and 10c extending through and beyond the tubular hubs 12 of the headers. The hubs 12 are made fast to the shaft by any suitable means such, for instance, as the set screws 13.

Disposed between the headers 11 and, preferably, substantially parallel with the shaft 10 are a plurality of trays 14 suspended at their ends from the headers 11, respectively, by means of suspension arms 15 connected at their lower ends with the trays and freely pivotally connected at their upper ends, as at 16, to the headers. The trays 14 may be arranged in any suitable or desired manner, but as illustrated, for purposes of example, they are arranged in spaced relation about the periphery of the headers while others are suitably disposed inwardly of the headers having their suspension arms 15 connected with spokes 11a. In this manner as many trays are utilized as is conveniently possible without contacting each other during the rotation of the reel.

The reel R is supported in position by a bail hanger 17, the free ends of the hanger having openings therein containing an anti-frictional bearing 18, through which trunion ends of the shaft 10 extend, respectively, and are retained in position by any suitable means, such as a cotter pin 19. The closed or loop end of the hanger has secured thereto, at a medial point in its length an eye 20, detachably engageable with a depending hook 21 carried by a trolley bracket 23 in which a grooved trolley wheel 24 is journalled. The trolley wheel 24 is designed to rest upon and travel over a track 25 suitably suspended from the top wall c of the smoke house. The track 25, as can be seen from Figure 2, is a continuation of the usual overhead trackage provided in meat houses, smoke houses and the like and which is well known in the art. As can be further seen from Figure 2 this trackage 25 is designed to deliver reels to any one of a plurality of smoke houses according to the position of a switch 25a usually provided for this purpose.

Positioned on the rear wall of each smoke house S is a bracket 26 supporting thereupon a journal bearing 27 in which a stub shaft 28 is journalled and arranged at substantially right angles with respect to the rear wall a of the smoke house. The bearing 27, as can be seen from Figure 4, is spaced from the rear wall of the smoke house and the end of the stub shaft 28 contiguous to the wall a extends from the bearing 27 to and, preferably, into an opening 29 in said wall. The opening 29 is positioned to align with the end of the reel shaft 10 supported in the smoke house from the track 25. The stub shaft 28 is provided with a concentric axially extending socket or recess 30 formed in or otherwise provided on its said extended end. The socket is cylindrical and transversely intersected by a pin 31, preferably, arranged chordally of the socket 30.

Keyed on said extended end of the stub shaft 28 is a worm-gear 32 under which is positioned a pan or cup 33 to receive and contain an oil or grease into which a portion of the gear 32 extends. As shown the pan 33 rests in a cut-out portion 34 of the bracket 26 and is supported thereby, and a screw 35 may hold the same against rattling and accidental displacement.

Figure 1:
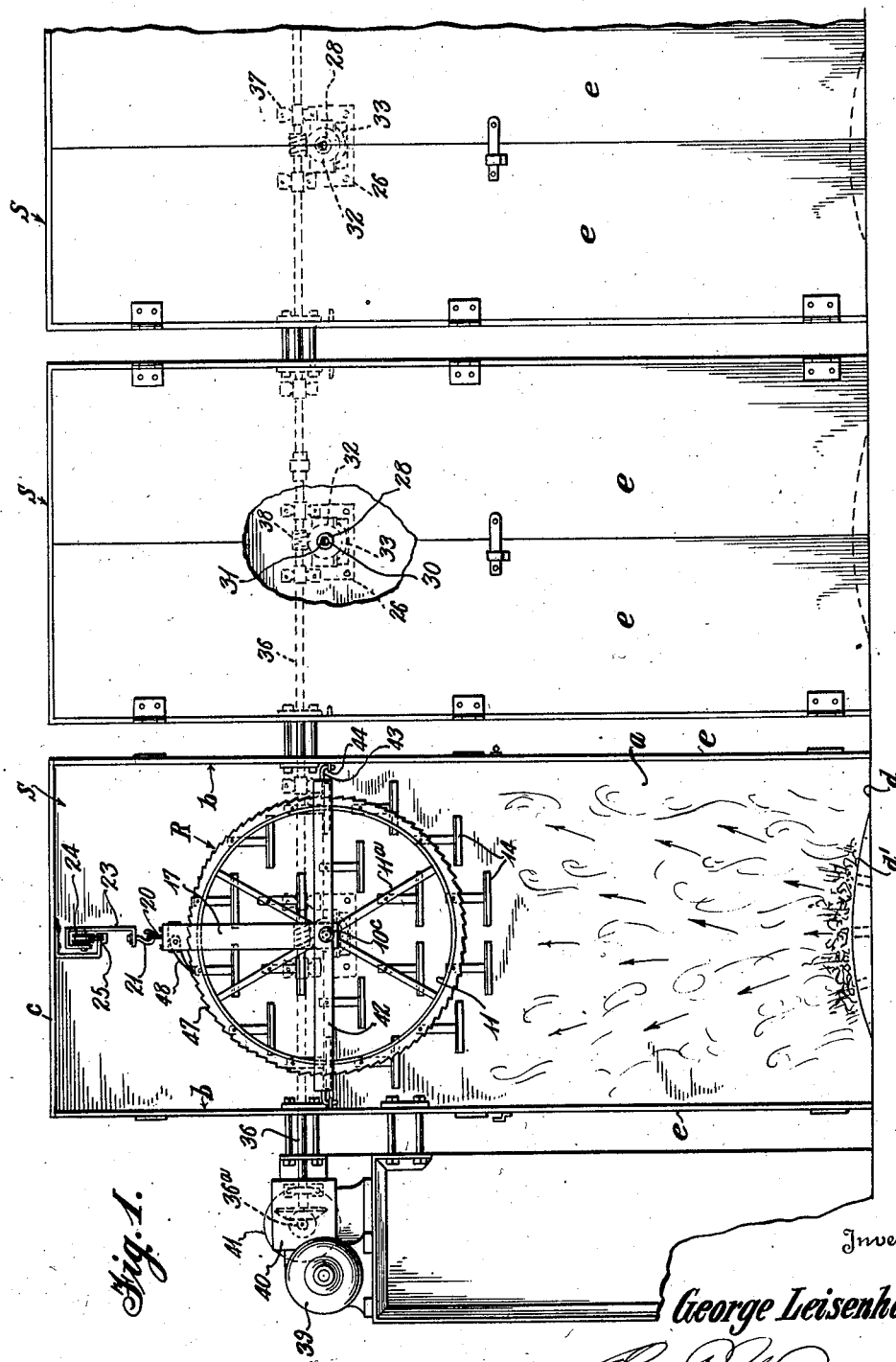
Figure 1 is a front elevation illustrating a battery of smoke houses or smoke chambers equipped with the present invention, one of the smoke houses being shown open to illustrate the reel therein in operative position.

The stub shaft 28 is, or all such stub shafts of each smoke house of a battery, as shown in Figs. 1 and 2, are driven from a common drive shaft 36 disposed at the rear of the smoke house and journalled in bearings 37 mounted on the rear walls a thereof, a worm or worms 38 being keyed to the drive shaft 36 and each arranged to mesh with a worm gear 32.

The drive shaft 36 is connected to a suitable source of power, which is shown by way of example therein, as comprising a motor 39 connected with reduction gearing box 40, which may contain a change speed gearing, and a clutch 41, all located at a convenient place such as at one end of a battery of smoke houses S.

By the employment of a common drive shaft disposed at the rear of a row of smoke houses, a very inexpensive and simple arrangement is provided for, requiring a minimum of parts and resulting in a consequent reduction in cost of installation and maintenance. Even when two rows of smoke houses are arranged back-to-back the common drive shaft may be employed for all of the smoke houses, in which case it may be more convenient to place the worm gear 32 on the outer end of the stub shaft 28, rather than on the inner end as shown; and in such event, it may be desirable to shorten the bracket 26 and to lengthen the bracket supporting the bearing 37, all of which is within the domain of mechanical skill.

Because of the construction of the instrumentalities and their arrangement, as employed by the present invention, the reel enters and is maintained in endwise position, relative to the depth of the smoke house. To establish an operative connection between the driving means and the reel, the shaft 10 of the reel has one end thereof 10a extending beyond the bale hanger 17 for a desired distance and is of a diameter to form a sliding fit with the recess or socket 30 in the stub shaft 28 into which it extends when the reel is properly arranged in operative position in the smoke house. One side of this end 10a of the shaft is chamfered longitudinally of its extremity for a distance inwardly of the shaft, as at 10b, to form a taper or wedge surface. This chamfered surface 10b is to engage and wedge against the pin 31 in the socket, thereby releasably keying the shaft 10 with the stub shaft 38, so that the reel may be rotated.

It is, of course, understood that during the operation of the reel it will remain suspended and supported from the track 25 in the smoke house through the trolley 24. In order to maintain the reel against swinging movement and against endwise movement, such as may cause a disconnection of the shaft end 10a from the socket 30, a removable brace bar 42 is provided, see Figures 1, 2, and 5. This brace 42 consists of a bar adapted to extend transversely, from side to side, of the smoke house at the entrance opening thereof, there being hook members 43 on each end of the brace bar 42. These hooks 42 are removably engaged in eyes or loops 44 on the inner surface of the side walls b—b of the smoke house adjacent the door opening therein and are preferably in horizontal alignment. An intermediate portion of the brace bar 42 is notched, as at 45, preferably on its underside, to detachably engage in or straddle a circumferential groove 46 in the outer extremity of the other end 10c of the shaft 10. It will thus be obvious that, when the bar 42 is in position as shown in Figs. 1 and 2 and the end 10a of the reel shaft 10 is in the socket 30, the reel will be maintained in a substantially stationary or fixed position and will be rotated about its axis during the smoking treatment within the smoke house so as to permit a uniform treatment of all of the products on the trays 14.

When the smoking treatment is completed it is only necessary to open the doors e of the smoke house, lift up the brace bars 42 to remove it and then withdraw the reel from the smoke house by a pulling motion which motion also simultaneously withdraws the end 10a from the socket 30.

The reel is usually loaded outside of the smoke house with the products to be treated and this is usually done from one side or from the bottom of the reel because of the suspended elevation of the reel with respect to the floor. The result is that one side of the reel becomes heavier than the other until all trays are loaded, thus causing the loaded trays to assume a lowermost position and making it difficult to load the uppermost trays. To avoid this difficulty the peripheral edge of one of the headers 11 is provided with a series of ratchet teeth 47 and a pawl 48 is pivotally mounted on an adjacent arm or portion of the bale hanger 17 to overlie and engage said ratchet teeth. This permits the lower trays of the reel to be loaded or unloaded first and, then, moved upwardly step by step until all of the lower trays are filled or unloaded. If necessary or desired, the pawl 48 may be swung to a neutral position, when the reel is in the smoke house, but in actual practice the pawl is so positioned with respect to the direction of operation of the drive shaft that the pawl is not a hindrance when the reel is in operative position in the smoke house.

Having thus described the invention and the manner in which the same is to be performed, it is to be understood that the invention is not to be limited to the exact construction as herein shown and described, but is susceptible to such changes and modifications as fall within the scope of the appended claims.

That which is claimed is:

1. In a smoke house having a smoke chamber provided with an entrance opening and closure means for said opening, a rotatable driving means on the wall of the chamber opposite the entrance opening, a rotatable reel movable endwise into and out of the smoke chamber and adapted to support the material to be treated, means at one end of the reel for releasably coupling the same to said driving means when the reel is in operative position in the chamber, a removable brace member extending transversely of the chamber from side to side thereof and having means at its ends for detachable connection with said walls of the chamber, and disconnectable interengaging means on said brace member and said reel for releasably maintaining said other end of the reel in position in the chamber.

2. In a smoke house having a smoke chamber provided with an entrance opening and a closure for said opening, a rotatable driving means extending through the wall of the chamber opposite the entrance opening and having a socket therein opening within said chamber, a rotatable reel for supporting the material to be treated, ambulatory means for supporting the reel and permitting its movement endwise into and out of the smoke chamber, an axially extending projection at one end of the reel receivable in said socket of the driving means for rotating the reel when the reel is operatively positioned in the chamber, and a bar having hook ends removably engageable in complemental members on the side walls of the chamber, said bar having a notch in an intermediate portion thereof adapted to straddle and engage into a circumferential groove in an axial projection on the other end of said reel for maintaining the reel in position in the chamber and connected with said socket.

GEORGE LEISENHEIMER.